United States Patent

Stoddard et al.

[11] Patent Number: 5,870,672
[45] Date of Patent: *Feb. 9, 1999

[54] VALIDATION METHOD AND APPARATUS FOR PREVENTING UNAUTHORIZED USE OF CELLULAR PHONES

[75] Inventors: Robert Eugene Stoddard; Michael Shaw McKinley, both of Sunnyvale, Calif.

[73] Assignee: Corsair Communications, Inc., Palo Alto, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 628,786

[22] Filed: Apr. 5, 1996

[51] Int. Cl.$^6$ .................................................. H04M 11/00
[52] U.S. Cl. .......................... 455/410; 455/515; 455/67.1
[58] Field of Search ................................ 379/59, 58, 63; 455/33.1, 115, 410, 515, 67.1, 67.3, 67.6; 342/165, 13

[56] References Cited

U.S. PATENT DOCUMENTS

| | | | |
|---|---|---|---|
| 4,837,575 | 6/1989 | Conner, Jr. | 342/45 |
| 5,005,210 | 4/1991 | Ferrell . | |
| 5,278,565 | 1/1994 | Horn | 342/165 |
| 5,305,007 | 4/1994 | Orr et al. | 342/20 |
| 5,329,591 | 7/1994 | Magrill . | |
| 5,345,595 | 9/1994 | Johnson et al. | 455/33.1 |
| 5,357,257 | 10/1994 | Nevin | 342/165 |
| 5,400,031 | 3/1995 | Fitts | 342/36 |
| 5,420,910 | 5/1995 | Rudokas . | |
| 5,448,760 | 9/1995 | Frederick . | |
| 5,469,165 | 11/1995 | Milroy | 342/13 |
| 5,627,886 | 5/1997 | Bowman | 379/111 |

*Primary Examiner*—David R. Hudspeth
*Assistant Examiner*—Scott Richardson
*Attorney, Agent, or Firm*—David E. Lovejoy

[57] ABSTRACT

Validating identification clusters formed of unique transmitter intercepts and validating clusters based on information within the cluster data with or without the aid of specific intercepts. Transmitter validation signals are allocated for validating specific ones of the transmitters. Analyzers identify specific received intercepts from specific ones of the transmitters to form an identification signal. Storage is provide for storing the specific received intercepts with corresponding identification clusters for marking the specific identification cluster as validated or invalidated. The valid and invalid states of the stored clusters are used to authorize or prevent access by the transmitters to the communication system.

38 Claims, 3 Drawing Sheets

VALIDATION METHOD AND APPARATUS FOR PREVENTING UNAUTHORIZED USE OF CELLULAR PHONES

BACKGROUND OF THE INVENTION

This invention relates to wireless subscriber systems and, more particularly, to RF signal characterizing devices for granting or denying access to wireless subscriber systems to prevent cellular telephone cloning fraud.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

Cellular Signals

Wireless cellular telephones have achieved wide-scale, world-wide use in cellular systems. The cellular phone communicates in a cellular system with the telephone switching equipment at a nearby cell site via wireless RF signals. The most prevalent standard used in the United States and other parts of the world is AMPS. AMPS uses four signals to communicate with the cell site:

a) Reverse Control Channel, RECC. The RECC is a Manchester encoded FSK (frequency shift keyed) signal from the cellular phone to the cell site. Some of the information contained in the RECC is the phone ID information for billing purposes and the phone number the user is dialing.

b) Forward Control Channel, FOCC. The FOCC is a Manchester encoded FSK signal from the cell site to the phone. The FOCC signal provides the cellular phone with the information needed to tune to the voice channels to allow for the voice conversation.

c) Reverse Voice Channel, RVC. The RVC is a narrow-band analog FM signal for voice communications from the cellular phone to the cell site.

d) Forward Voice Channel, FVC. The FVC is a narrow-band analog FM signal for voice communications from the cell site to the phone.

The phone ID information (identification number) contained in the RECC is the Mobile Identification Number, MIN, and the Electronic Serial Number, ESN. The MIN is a ten digit number assigned by the cellular carrier when the phone is activated. The MIN is also the phone number of the phone. The MIN can be programmed via the phone keypad of the cellular phone. The ESN is a four byte word containing the serial number of the phone. The most significant byte is the manufacturer code, MC, of the phone. The MC is a value between 129 and 255. For example, 129 are OKI phones, 130 are older Motorola phones and 195 are newer Motorola phones. The other three bytes are unique for each phone made by that manufacturer, these bytes are chosen by the manufacturer. The ESN for a cellular phone is not to be changed for any reason as mandated in the United States by Federal Communications Commission (FCC) regulations.

Approximately every 15 minutes while the cellular phone is turned on, the phone emits a RECC signal that is received and processed by the nearest cell site. This operation is called registering. This registration process allows the cellular system to pre-approve service and to estimate how many phones are active in each site.

A call is initiated by the user entering the phone number (dialed digits) into the cellular phone and pressing the SEND button. The phone then sends the RECC signal with the dialed digits to the cell site. The equipment at the cell site verifies that the MIN and ESN received from the cellular phone are those of an active account in good standing and then authorizes service. The site then sends the FOCC signal to the phone with the RVC and FVC assignments. The cellular phone tunes it's transmitter to the RVC and receiver to the FVC and the conversation can begin on the two forward and reverse voice channels.

Cellular Phone Cloning

The information used for billing charges to a subscriber is the MIN and ESN from the cellular phone. If a second (unauthorized) phone has the same MIN and ESN as the first phone, the cellular system will bill the authorized user of the first phone for the unauthorized calls of the second phone. Unauthorized users have many means available for obtaining the MIN and ESN of an authorized subscriber account including:

use of an antenna, commercial receiver and a personal computer (PC) to detect RECC transmissions unauthorized disclosures from employees at cellular phone marketers misappropriation of cellular phones Once an unauthorized user has a valid MIN and ESN, the unauthorized user can program multiple unauthorized cellular phones to use the valid MIN and ESN information of an authorized user. All unauthorized calls by the unauthorized "cloned" phones will be wrongly billed to the authorized user's account. Equipment used to clone phones is available commercially from several companies.

Clone Cellular Phone Detection

There are three main methods that are used to detect clone cellular phones and calls used for cellular phone fraud, namely, profilers, glare and RF "fingerprinting."

Profiler Method. A profiler is a computer program that detects cellular phone usage patterns for each MIN in the cellular system. The patterns include the dialed digits, time of day and day of week of most calls, geographic locations for the calls and frequency of use of the cellular phone. This profiler technique detects unauthorized use (fraud) long after the unauthorized calls have been completed. When a cellular provider detects unauthorized use for the authorized subscriber, the provider contacts the authorized subscriber; reprograms the authorized subscriber's phone with a new MIN and typically forgives the phone bill for the authorized subscriber for that period of time. The old MIN is deactivated. The cost of the fraud is absorbed by the cellular provider. The change of MIN can be very inconvenient to the authorized user since it requires time to change the MIN and results in a new phone number that can require the user to change stationary and to inform friends and business associates of the change. It is becoming increasingly common for the cellular provider to deny service to a MIN when a usage pattern does not fit the profiler model. Authorized users seeking service can be denied service as a result of the user simply going to a different city and calling an area code that the user has not often called in the past.

Glare Method. Since by convention there can only be one cellular phone for each MIN, there cannot be two phone calls at the same time from cellular phones using the same MIN. The glare method is a system that looks for occurrences of two or more simultaneous calls by the same MIN. Glare can be used to look for two calls within a period of time from cell sites a significant distance apart such that it would be impossible normally for an authorized cellular phone to be located at those different sites within the period of time. For example, it would be impossible for an authorized user to make two calls 5 minutes apart from cell sites 50 miles apart. As with profilers, glare systems usually detect clone fraud long after the fact. It is difficult to use glare to block calls in real time since there is no way of knowing which, if either, of two concurrent calls is from an authorized user.

RF Fingerprinting Method. Cellular phones create and transmit RECC signals with a set of electronic components including resistors, capacitors, inductor, amplifiers, and integrated circuit chips. Each of these components have manufacturing variations that affect their electrical characteristics. These variations mean that no two cellular phones are exactly alike electrically and accordingly, their RECC signals will vary from phone to phone at least in small ways. These variations are, of course, well within the manufacturing and operational specifications for cellular phones and do not effect the proper operation of the phones. By intercepting, digitizing and analyzing the RECC signals with sophisticated digital signal processing (DSP) algorithms, it is possible to measure a set of signal parameters in the RECC signal that can uniquely identify one cellular phone from all other cellular phones. This collection of parameters is called the "RF fingerprint" of a cellular phone.

A specific RECC signal collected by the RF fingerprint system is called an "intercept". The key information for each intercept includes the MIN, ESN, dialed digits, time, date, cell site, fingerprint parameters and signal quality factors. An intercept can be from any type of RECC signal.

An RF fingerprint system determines the fingerprint for every intercept and creates a library of similar fingerprints for each MIN and these are stored in a computer. A group of similar fingerprints for a specific MIN/ESN form a "cluster" that can be described by statistical values. When a new intercept arrives for a MIN, the system interrogates all the clusters observed for that MIN to see if the call fingerprint matches the clusters on file. If the fingerprint does not match the cluster generated by calls from the authorized user, the call is judged fraudulent or unauthorized and can be stopped before any conversation begins. Similarly, if a call fingerprint from a cellular phone is a good match to a cluster from a known unauthorized clone phone, the call similarly can be stopped before any conversation occurs.

One of the difficult steps encountered in using an RF fingerprint system is identifying ("validating") which cluster is associated with an authorized user or an unauthorized user. Positively validated clusters are made up of intercepts from the authorized user and negatively validated (invalidated) clusters are from unauthorized users. It is more desirable to have positive validations since all unauthorized clone phones will not match the single good cluster for an authorized user. A positive validation can stop all clones. A negative validated cluster can only stop one unauthorized clone phone when it is intercepted again and cannot stop other unauthorized clones using the same MIN. When a system has a positive validation for a MIN, the negative validations can be ignored.

Cloning fraud occurs when unauthorized users reprogram unauthorized cellular phones with identification numbers (MIN and ESN) from authorized cellular phones. This reprogramming (cloning) permits unauthorized users to place cellular phone calls without paying for those calls. A method is needed to distinguish between unauthorized cloned phones and authorized phones so that steps can then be taken to prevent the cloned phones from having access to the cellular phone system.

In the Magrill patent (U.S. Pat. No. 5,329,591), the Ferrell patent (U.S. Pat. No. 5,005,210), the Fredrick patent (U.S. Pat. No. 5,448,760 and the Rudokas patent (U.S. Pat. No. 5,420,910), systems are provided for preventing access by unauthorized users. None of the Magrill, Ferrell, nor Fredrick patents takes into account the RF (radio frequency) propagation effects that distort the transmitted waveform from the wireless subscriber unit. Transmitters that are a long distance away from the identification system will have a low signal-to-noise ratio. In cellular telephone applications, frequencies are reused which increase the probability of co-channel interference from a nearby cell. Some wireless subscriber units attempt to access the wireless subscriber system at the same time as other units thereby causing co-channel interference.

A fraudulent user may attempt to gain access to a wireless network several consecutive times within a short period of time. Such repeated attempts may be detected or may result in the fraudulent user gaining access to the system. Prior systems do not use the results of previous decisions on access to aid in the current decision as to whether or not the current attempt is legitimate. Prior systems do not provide techniques for fraud detection using the outputs of diversity and sectorized antennas typical of cellular base stations.

Although the Ferrell system extracted a transient parameter to characterize transmitters and may have worked in the environment described that consisted of a few ham radio transmitters, a need exists for systems that have the ability to distinguish between thousands of authorized phones and unauthorized phones in cellular phone system.

Ferrell, Magrill, Rudokas and Frederick teach various methods of generating RF fingerprints from current signal intercepts and comparing them with stored fingerprints from earlier signal intercepts. Rudokas discusses a negative and a positive database of fingerprint or cluster histories. The negative database consists of clusters from cellular phone handsets known to be used to clone valid cellular phones. A positive database consists of clusters from known valid phones. There is no discussion in any of these prior art on how to positively or negatively validate a cluster to a known good or bad user.

Accordingly, there is a need for improved fraud prevention systems having parameters that are effective in distinguishing between authorized cellular phones and unauthorized clone cellular phones in cellular systems.

SUMMARY OF THE INVENTION

The present invention is a transmitter identification system for identifying transmitters in a communication system such as a cellular system. Each transmitter broadcasts transmitter signals. The transmitter signals are formed by processing information for manipulating a carrier so that the transmitter signals include signal parameters (traits), resulting from the processing, that are unique and characteristic of the transmitter. These parameters are called the "fingerprint" or intercept of the transmitter. The transmitter identification system includes a receiver for receiving transmitter signals, a detector for detecting the received signals to recover identification codes corresponding to the transmitters, and characterizing means for characterizing parameters of the received signals to form intercepts corresponding to the transmitters. The intercepts are stored as identification clusters for identifying the transmitters.

The present invention includes apparatus for validating the identification clusters including control means for specifying transmitter validation signals allocated for validating specific ones of the transmitters, analysis means for identifying a specific received intercept from specific ones of the transmitters to form an identification signal, storage for storing the specific received intercepts with corresponding identification clusters and marking means for marking the specific identification cluster as validated or invalidated. The valid and invalid states of the stored clusters are used to authorize or prevent access to the communication system.

DETAILED DESCRIPTION

Figure 1:
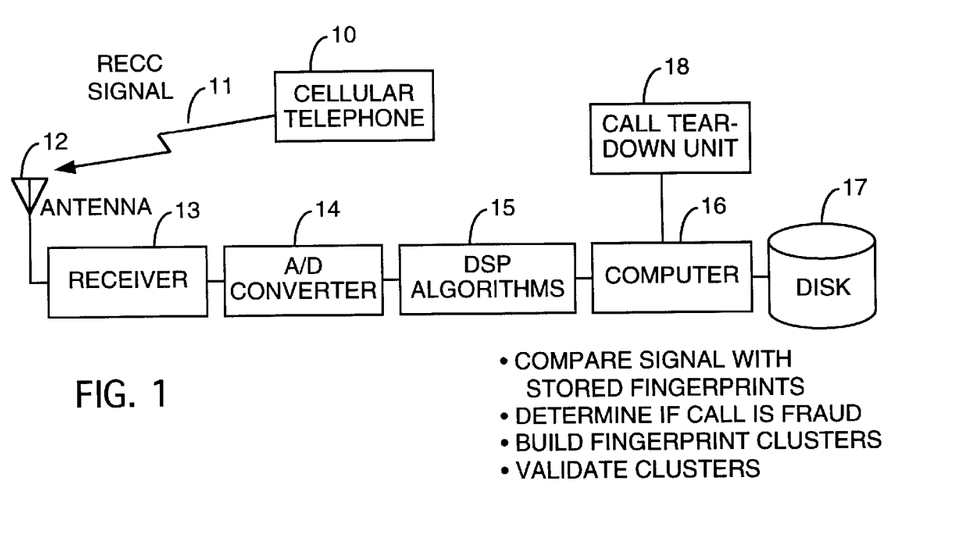
FIG. 1 is a block diagram of a cellular telephone system with a cell characterizing unit that employs cluster validation.

FIG. 1 shows the radio transmitter, the signal intercept system and the RF fingerprint system. The transmitter, 10, emits signal 11 that is collected by antenna 12 and receiver 13. The receiver output is digitized by A/D converter 14. The digitized data are processed by digital signal processing algorithms, 15, that perform the intercept characterizations of decoding the signal and calculating the RF fingerprint for the signal. The A/D converter 14 and intercept characterizer 15 together comprise the RECC detection system 19. The system computer, 16, checks the fingerprint 20 of the received signal 11 with the fingerprint clusters on file 22 and 23 on medium 17. If the intercept is determined to be fraud from this comparison, the computer 16 sends a tear down command to the call tear down unit 18 which denies the call service.

Figure 2:
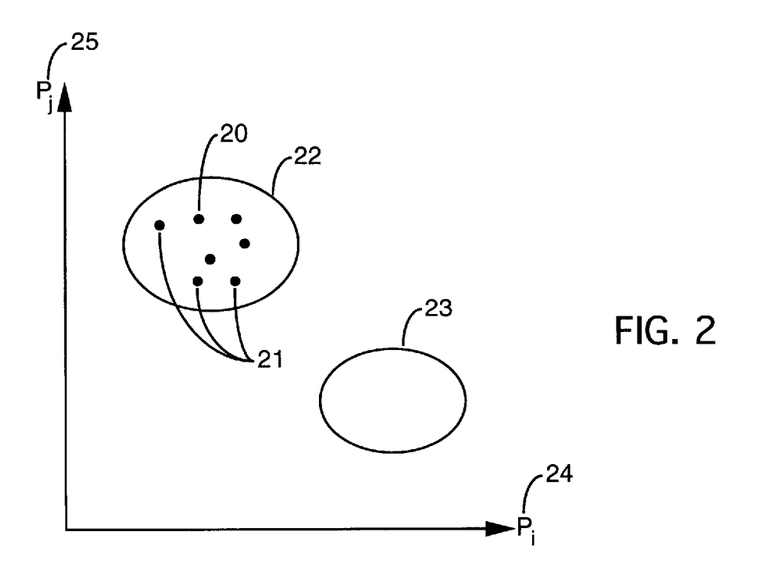
FIG. 2 is a graphic representation of clusters used in the FIG. 1 system.

FIG. 2 shows a plot of two of the signal features, i and j, that comprise the RF fingerprint. The fingerprint for a specific signal intercept 20 is shown on the plot. Other signals intercepted, 21, from the same phone are shown near by the intercept 20. Together these fingerprints from individual signal intercepts form a fingerprint cluster 22. FIG. 2 shows two of the dimensions, i and j, as it is impossible to show a large number of parameter dimensions. Cluster 23 is a second fingerprint intercepted using the same transmitter identification code.

Figure 3:
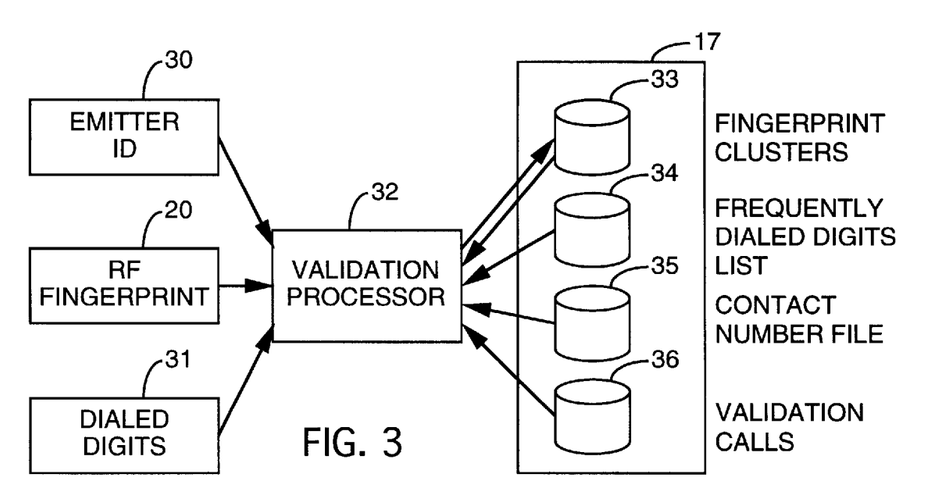
FIG. 3 is a block diagram of the cell characterization unit of the FIG. 1 system.

FIG. 3 shows the various data used for validation within processor 16 and storage medium 17. The transmitter ID (phone's MIN and ESN) 30 and dialed digits 31 are extracted from the RECC signal 11 by either the receiver 13 or the intercept characterizer 15. This information along with the RF fingerprint 20 of the intercept are available to the validation processor 32 within the computer 16. These information for the signal intercept are required for validation. The processor 32 looks up the fingerprint clusters 22 and 23 on file in storage medium 17 for the ID 30 of the intercept. Next it compares the fingerprint 20 with the clusters on file 24 to find the cluster 22 that matches the fingerprint. If the dialed digits 31 for the intercept are on the frequently dialed digits list 34, contact number list 35 or list of validation calls 36, it is assumed that the intercept was produced by the good user's transmitter and the fingerprint 22 is positively validated.

Validation Techniques. Validation is the process of associating a cluster 22 with the legitimate user (positive validation) or an illegitimate user (negative validation). Many validation techniques use the knowledge of one call. If it is known that one call 20 was made by the legitimate phone, the cluster 22 that matches the fingerprint of the call can be positively validated. The same logic applies to negative validation with a known fraudulent call. There are two classes of validation techniques, active and passive. Active validation techniques are those that require participation of the owner of the phone. Passive techniques are those that are done without the participation or even the knowledge of the phone's owner.

Active Validation Techniques

There are four main methods of active validation, namely, Contact Numbers, Validation Call, Validation Point of Sale, Validation and Factory Validation. TABLE 1 hereinafter lists computer code that is used to validate clusters using phone calls that have the same dialed digits as those on the MINs lists of frequently dialed digits, contact numbers or validation calls. TABLE 1 also shows validating based on the first call on a new account.

Contact Numbers Validation. Contact numbers 35 are phone numbers the phone's owner tells the cellular carrier that are numbers he will dial often. The owner's home phone number is the most common contact number. The cellular carrier uses these numbers to help develop a profile on the user and to verify the user. If the phone is stolen, the carrier can call the phone and ask the user to verify he owns the phone by calling the contact number. If the user cannot call the contact number, the service is discontinued. When the RF fingerprint system receives an intercept, it looks up the contact number for the MIN. If the dialed digits 31 match the contact number 35, the fingerprint system will positively validate the cluster 22 matching the intercept's fingerprint 20.

Frequently Dialed Digits Validation. Each user has a set of phone numbers he dials most often. This set of dialed digits tend to be very unique for each user. If these frequently dialed digits 34 are known for a user, the RF fingerprint system can validate the cluster for the intercept MIN that matches the intercept with one of the frequently dialed digits observed for the user.

Profilers and billing systems can be programmed to generate frequently dialed digit lists. One technique is to develop a histogram of dialed digits for each MIN each month. The most frequently dialed digits from the current month are compared with those from two or three months ago. The dialed digits common to both the current and old lists are assumed to be from the legitimate user and are used to validate fingerprints for the MIN.

Validation Call Validation. The owner of the phone can be instructed by the cellular carrier to make a Validation Call 36 to a specific number within a short period of time. The RF fingerprint system would be given the information that the legitimate user would make such a call, when the system intercepts the call, the RF fingerprint cluster would be positively validated by the intercept. For security purposes, the validation phone numbers and the times of the calls must be random events so the fraud users cannot make validation calls with their phones. For this technique to work, the RF fingerprint system must be operational in a large percentage of the market for the cellular carrier. The system must intercept the calls.

Point of Sale Validation. The best time to do the validation is at the time the phone is purchased so the phone is protected by the RF fingerprint system immediately. One concept was to use the first intercept by a new account as the validation call. Unfortunately, some of the fraud occurs when the MIN/ESN for a new account is fraudulently sold to unauthorized users by employees of a retail establishment. In these cases, it is not uncommon to have the first intercept by a new account to be a fraudulent call. For a point of sale validation to work, there needs to be coordination with the cellular companies so that a new account is not active until the validation call is made. The retailer must make the validation call so the phone will work and the user will accept the phone. The authorization system will ignore any other validation calls after the first one.

Factory Validation. Each phone is fingerprinted at the factory. Factory Validation presents a few problems such as, the MIN is not assigned yet and it is not known where in the world the phone will be sold. Therefore, the clusters must be distributed to all markets since there is a chance that the phone will reach any market. A further refinement of this technique is to open all phones at a distribution center in the market of sale and place validation calls with each phone. However, it is a marketing impediment to open the sealed package for each phone.

Passive Profiler Based Techniques. The cellular profiler software looks for patterns in the MIN usage patterns. These patterns are used to identify specific calls by the authorized user and by the unauthorized user. These patterns include the dialed digits, locations of the calls, time of the calls, and so on, determine if the call was likely to come from the authorized or unauthorized user. Each call that is known with a high probability can be used to validate the cluster matching the calls intercept.

Passive Fingerprint Based Techniques. Passive fingerprint based validation involves techniques that do not involve participation or information from the user or the carrier. These techniques can be implemented in the validation processor 32 of FIG. 3 solely with information available to the fingerprint system such as the fingerprint clusters 33.

Fraud Validation Based On Manufacturer (MFG) Mismatch. Different phone manufacturers use different components and assembly techniques to build and tune phones. These components and assembly techniques create RF fingerprint classes that are unique to the manufacturer. A fingerprint class consists of a unique combination of the ranges for a subset of the parameters making up the fingerprint. Fingerprint algorithms are designed to produce fingerprint parameters that are unique for each manufacturer. These algorithms allow the fingerprint system to identify the manufacturer of the phone emitting a given intercept without using the ESN.

All intercepts include the MIN and the ESN. The most significant byte in the ESN is the manufacture code for the phone. The clone phone emits the ESN claiming to be the same manufacturer as the phone it clones. In cases where the clone phone is a different manufacturer as the legitimate phone, the fingerprint will not match any fingerprint classes ever observed for the claimed manufacturer. The fingerprint system can detect this and mark the intercept as fraudulent.

The fingerprint system can identify all fingerprint cluster that do not match any of the fingerprint classes for that ESN and negatively validate that cluster. Whenever an intercept is received that is a match to a negatively validated cluster, the call is blocked.

As a safety measure, the system can calculate the probability that the fingerprint is from a known different manufacturer than from the manufacturer given in the ESN. If this probability is high enough, the cluster can be negatively validated (invalidated) or the call can be blocked. An example of computer code that implements manufacturer mismatch validation is given in TABLE 3 hereinafter where mfg_val_enabled=1 and mass_val_enabled=0.

Single Cluster Validation. The RF fingerprint system collects fingerprints for every phone having a received broadcast signal. When there is only one cluster observed and stored for a given MIN, it is usually a safe assumption that the cluster is indeed the authorized user. There are cases, however, where the MIN/ESN is misappropriated at the point of sale so that first calls can be by unauthorized users so that in such cases, validating the only fingerprint cluster is not desirable.

From time to time, the system can intercept a "wild-shot" fingerprint where the fingerprint is not representative of the other fingerprints intercepted for that phone. This wild-shot fingerprint can be due to some combination of too high or low signal power, low phone battery, multipath interference, co-channel interference and phone glitch. These wild shots can create additional clusters for a single phone. The RF fingerprint system is generally designed to have very few wild shots so that extra clusters are uncommon and have few intercepts.

Single cluster validation is safe when the following additional rules are observed:
  there is only one cluster 22 with a large number of intercepts 21, ten or more intercepts can be safe for a well designed system
  all other clusters 23 have very few intercepts where one or two is a good maximum
  the MIN is not a roamer since it is common to only see the unauthorized user with roamers. A roamer is a user that is not located in a home market
  only use the technique where the RF fingerprint system is widely deployed in the market so the system has a high probability of observing the legitimate user Single cluster validation assumes that minor clusters are wild shots because, when an unauthorized use of a MIN occurs, a large number of unauthorized calls with that MIN are usually observed. TABLE 2 hereinafter lists computer code used to implement single cluster validation techniques.

Validate All Clusters. One validation technique positively validates all clusters for MINs that have no previously validated clusters. This technique initially validates both authorized and unauthorized users. Superficially, such initial validation of unauthorized users does not appear to be desirable because the unauthorized users appear as authorized users and their unauthorized calls are allowed. However, this initial validation of unauthorized users is no worse than the situation that exists in the absence of any validation actions since in the absence of validation actions, all of the unauthorized calls are allowed anyway. The cellular carrier can detect the unauthorized calls at a latter time with a call profiler and with analysis of user phone use records. At this later time when unauthorized calls have been detected, the MIN is changed for any authorized user that has been defrauded by an unauthorized user. After the MIN change for the authorized user, the unauthorized user calls will not be allowed by the cellular carrier. Therefore, the unauthorized user must change MINs to make calls. If all MINs used in the market area have validated clusters, the unauthorized user will necessarily clone a MIN that has validated clusters. In such a situation, the RF fingerprint validation system will detect the unauthorized user and will block the unauthorized calls.

This positive validation of all clusters technique works best where the RF fingerprint system has clusters for most of the users in the market area and the system is widely deployed in the market. An example of computer code that implements mass cluster validation is given in TABLE 3 hereinafter where mfg_val_enabled=1 and mass_val_enabled=1.

Dialed Digit Association. There are some cellular customers who clone their own phone in order to have an "extension" phone. While such personal cloning is not authorized, the practice is becoming more common. The RF fingerprint system detects these extension phones as unauthorized clones and blocks their calls. Some cellular carriers have elected to be aggressive with such personal cloning users and desire to mark the unauthorized clusters so that they cannot be validated as authorized. Such aggressive action is important since many of the validation techniques would eventually validate the extension phone's clusters as being authorized for a user. Other cellular carriers have elected to validate these extension phones as authorized for users so the RF fingerprint system does not block the calls. An RF fingerprint system needs a method of distinguishing extension phones used by the authorized user from unauthorized phones used by the unauthorized user.

The best way of associating multiple RF fingerprints as coming from the same user is by the dialed digits (phone numbers) that the authorized user dials. By observing the dialed digits associated with the intercepts used to build each cluster, if multiple clusters for the same MIN have dialed digits in common, they are very likely to be from the same user. These dialed digits can be stored with the fingerprint clusters 33 or in a separate storage system. Common numbers such as 411, 611, 555-1212, and so on, must be ignored. A further refinement of this technique includes the following rules: a) require each cluster to contain calls by at least two calls to a dialed digit in common with another cluster, b) ignore dialed digits called by any other cellular caller over some period of time, c) require multiple dialed digits to be held in common for a given MIN.

There are a few removable automobile phones, called car kits, that can emit one fingerprint cluster for the handset removed from the car kit and a different clusters when it is placed in the car kit. Once one of the clusters is validated, all calls corresponding to the other car kit will be denied service. In this case it is desired to positively validate the clusters for both phones. The dialed digit association can be used to link the two clusters to the same user, however, we don't know if the two clusters represent a car kit or represent an illegal extension phone.

The Station Class Mark (SCM) word in the RECC signal contains the power class of the phone. This indicates whether the phone is a low power phone (handset) or a high power phone (car phone). When the dialed digit association links two phones, the SCMs can be checked. If the two clusters are composed of RECC intercepts from different power classes, a stronger indication is present that the phone may be a car kit and therefore both clusters should be positively validated.

It has been noted that these car kits are only manufactured by Motorola. Therefore, as a further refinement, validation is warranted when two clusters are a) linked by dialed digits, b) have high and low power classes, c) both are typical of clusters from Motorola phones, and d) the ESN indicates the phone is a Motorola phone.

Practical Passive Fingerprint Validation. A good technique for validating a market is to use active techniques while the system is being deployed and clusters are being collected for most of the market. Single cluster validation can be used during this deployment period. Once the cluster library is mature, it is effective to use the Fraud Validation based on manufacturer mismatch technique to negatively validate all clusters identified as being unauthorized. At the same time, positive validation of all other clusters occurs for MINs method previously validated clusters.

Negative Database Validation. When the RF fingerprint system detects a call as unauthorized, the dialed digits and the fingerprint of the unauthorized call are stored in a separate database. This database is called a negative database since it contains negative information on the MIN. In the future, if the unauthorized user has reprogrammed a phone to a different MIN that is not validated in the fingerprint system, the system can use the negative database for the MIN. If the new unauthorized call dialed digits and the fingerprint match a previous unauthorized call, the new call is accessed as fraud based on the match. This call will be denied service and the fingerprint cluster matching the call will be negatively validated. This negative validation allows the system to block all future calls by that user on their MIN.

This negative database process will terminate all calls by a phone on any MIN given that the user was identified as unauthorized before and the user continues to call the same dialed digits in the future. An example of computer code that implements negative database validation is given in TABLE 4 hereinafter.

TABLE 1

COPYRIGHT © 1996 CORSAIR COMMUNICATION INC.

```
/* Process new intercepts for validation events.
clusters is a structure that contains the fingerprint cluster information for the MIN including:
 - parameter information
 - esn( ), mfg_code( )
 - dates of first and last intercept, and first, last validation event
 - contact_numbers( ) including contact numbers and frequently dialed digits
 - nic( ) = number of intercepts currently in cluster
 - cluster_status( ):
      -1: never validate
       0: not validated, neutral
       1: validated as legitimate user
       2: validated as unauthorized user
fingerprint is a structure containing the fingerprint information of the current intercept:
 - parameter information
 - parameter and environmental quality factors
 - time, date, site of intercept
 - esn, dd (dialed digits), scm
```

TABLE 1-continued

COPYRIGHT © 1996 CORSAIR COMMUNICATION INC.

```
- tear down reason code
first_call_validate is a flag enabling validation based on first call on new account
*/
nclusters = get_clusters(MIN,clusters);                    /* get all "nclusters" clusters for the MIN */
if(nclusters == 0)
  {
    status = create_new_account(MIN,fingerprint);          /* create new account with first cluster */
    if(first_call_validate == 1)
      {
        cluster_status(1) = 1;                             /* validate cluster 1 (only cluster) as from good user */
      }
  }
else
  {
    closest_cluster = find_closest_cluster(clusters, fingerprint);
                                                           /* get cluster with best match intercept */
    if(cluster_status(closest_cluster) >= 0)               /* neutral cluster, check for new validation */
      {
        dd_match = check_dd_match(cluster, fingerprint);
                                                           /* is intercept DD on contact number list for MIN */
        if(dd_match == 1)                                  /* dialed digits of intercept match those given for customer */
          {
            cluster_status(closest_cluster) = 1;           /* validate cluster as good user */
          }
        dd_match = check_dd_phone_company(cluster_fingerprint);
                                                           /* is intercept DD on contact number list for MIN */
        if(dd_match = = 1)                                 /* dialed digits of intercept match those of validation call */
          {
            cluster_status(closest_cluster) = 1;           /* validate cluster as good user */
          }
      }
  }
```

TABLE 2

COPYRIGHT © 1996 CORSAIR COMMUNICATION INC.

```
/* Process to validate clusters based on cluster database information only. The process is run
on all MINs in the database. Subroutine check_mfg_model returns the log of the probability of
the cluster belonging to a different manufacturer than the one claimed in the ESN. For example,
if the value 8 were returned, the cluster is 10^8 more likely to be a different manufacturer than
the one claimed.
1. Single Cluster Validation
*/
for (min_index = 0; min_index < n_mins_total; ++min_index)
{
  n_valid_clusters = get_valid_clusters(min_index, cluster,first_valid_cluster);
  if(n_valid_clauters = = 0)                                /* no currently validated clusters */
  {
    n_mature_clusters = get_mature_clusters(min_index, cluster,first_mature_cluster);
    if(n_mature_clusters == 1 && cluster_status(first_mature_cluster) == 0)
      {
        n_mature = 0;
        for(cluster_no = 0; cluster_no < n_clusters; ++cluster_no)
          if(nic(cluster_no) > immature_threshold)
            ++n_mature;
        if(n_clusters - n_mature == 1)                      /* one mature cluster, rest immature */
          {
            if(use_mfg_model == 1)                          /* use manufacturer model for sanity check on cluster */
              {
                mfg_prob = check_mfg_model(cluster, first_mature_cluster);
                if(mfg_prob < mfg_validation_threshold)     /* match to mfg model for ESN? */
                  cluster_status(first_mature_cluster) = 1; /* validate mature cluster */
              }
            else
              {
                cluster_status(first_mature_cluster) = 1;   /* validate mature cluster */
              }
          }
      }
  }
}
```

TABLE 3

COPYRIGHT © 1996 CORSAIR COMMUNICATION INC.

```
/* 2. Mass Validation and Manufacturer (Mfg) Mismatch Validation.
Perform Mass Validation if variables mfg_val_enabled = 1 and mass_val_enabled = 1.
Perform Mfg Mismatch Validation if variables mfg_val_enabled = 1 and mass_val_enabled = 0.
*/
for (min_index = 0; min_index < n_mins_total; ++min_index)
{
  n_valid_clusters = get_valid_clusters(min_index, cluster,first_valid_cluster);
  if(n_valid_clauters == 0)                           /* no currently validated clusters */
    {
    unauthorized_flag=0;
    for(cluster_no = 0; cluster_no < n_clusters; ++cluster_no)
        {
         if(nic(cluster_no) > mature_threshold && mfg_val_enabled == 1)
            {
             mfg_prob = check_mfg_model_(cluster, cluster_no);
            if
mfg_unauthorized_validation_threshold)
             {
              cluster_status(first_mature_cluster) = 2;
                                                    /* unauthorized validate mature cluster */
              unauthorized_flag = 1;
              }
            }
         }
    if(unauthorized_flag == 0 && mass_val_enabled == 1)
        /* did not find any unauthorized clusters based on mfg model, validate the rest */
        for(cluster_no = 0; cluster_no < n_clusters; ++cluster_no)
           cluster_status(cluster_no) = 1;              /* positively validate cluster */
}
```

TABLE 4

COPYRIGHT © 1996 CORSAIR COMMUNICATION INC.

```
/* Negative Database. This algorithm is called for every call that is not blocked by other RF
fingerprint mechanisms such as a mismatch to a positively validated cluster or a mismatch to an
unauthorized validated cluster. Flag block_current_call will be set to 0 coming into this routine.
There are n_neg_db_mins MINs in the negative database with:
      MINs in array min_neg_db( )
      fingerprint information in structure fp_neg_db( )
*/
nclusters = get_clusters(MIN,clusters);                /* get all "nclusters" clusters for the MIN */
val_flag = 0;
for(cluster_no = 0; cluster_no < n_clusters; ++cluster_no)
{
   if(cluster_status(cluster_no) > 0)
     {
      val_flag = 1;
      break;
     }
}
if(val_flag == 0)                                      /* no validated clusters for MIN */
{
    for(min_no = 0 min_no < n_neg_db_mins; ++min_no)   /* scan all negative DB MINs */
{
    if(min == min_neg_db(min_no))
       {
        dist = calc_dist(fingerprint, fp_neg_db(min_no));
        if(dist < neg_db_dist_thr)
          {
           block_current_call =93;                     /* set flag to block this call based on neg DB match */
           closest_cluster = find_closest_cluster(clusters, fingerprint);
                                                      /* get closest cluster */
           if(cluster_status(closest_cluster) == 0)
                                                      /* neutral cluster, check for new validation */
             {
              dist = calc_dist(fingerprint, clusters(closest_cluster));
              if(neg_db_val_enabled == 1 && dist < neg_db_val_dist_thr)
```

TABLE 4-continued

COPYRIGHT © 1996 CORSAIR COMMUNICATION INC.

```
          cluster_status(closest_cluster) = 2;            /* negative validate cluster in library */
        }
      }
    }
  }
}
```

While the invention has been particularly shown and described with reference to preferred embodiments thereof, it will be understood by those skilled in the art that the foregoing and other changes in form and details may be made therein without departing from the spirit and scope of the invention.

We claim:

1. In a transmitter identification system for identifying transmitters where each transmitter broadcasts transmitter signals and where, said transmitter signals are formed by processing information for manipulating a carrier, said transmitter signals include signal traits resulting from said processing that are characteristic of said transmitter, and said transmitter signals including an identification code identifying said transmitter, said transmitter identification system including, receiver means for receiving transmitter signals transmitted by said transmitters to provide corresponding received signals, detection means for detecting said received signals to recover identification codes corresponding to said transmitters, characterizing means for characterizing features of the signal traits of said received signals to form received intercepts corresponding to said transmitters, storage means for associating said received intercepts as identification clusters for identifying said transmitters, an apparatus for validating identification clusters derived from intercepts from a specific one of said transmitters comprising:

control means for specifying known transmitter validation signals allocated for validating said specific one of said transmitters and for generating a known specific identification intercept, analysis means for identifying said known specific identification intercept received from said specific one of said transmitters to form an identification signal, storing means for associating said known specific identification intercept with a corresponding specific identification cluster stored in said storage means, marking means for marking said specific identification cluster as validated in response to said identification signal.

2. The apparatus of claim 1 wherein said control means specifies said transmitter validation signals as transmission signals received in response to a requested transmission from said specific one of said transmitters.

3. The apparatus of claim 2 wherein said transmitter validation signals include a specific cellular phone number allocated for validation.

4. The apparatus of claim 1 wherein said control means specifies said transmitter validation signals as transmission signals received in response to a call placed by a cellular phone for validation.

5. In a transmitter identification system for identifying transmitters where each transmitter broadcasts transmitter signals and where, said transmitter signals are formed by processing information for manipulating a carrier, said transmitter signals include signal traits resulting from said processing that are characteristic of said transmitter, and said transmitter signals including an identification code identifying said transmitter, said transmitter identification system including, receiver means for receiving transmitter signals transmitted by said transmitters to provide corresponding received signals, detection means for detecting said received signals to recover identification codes corresponding to said transmitters, characterizing means for characterizing features of the signal traits of said received signals to form received intercepts corresponding to said transmitters, storage means for associating said received intercepts with identification clusters for identifying said transmitters, an apparatus for validating identification clusters derived from intercepts from a specific one of said transmitters comprising:

control means for specifying transmitter validation signals allocated for validating said specific one of said transmitters and for generating a specific identification intercept wherein said control means specifies said transmitter validation signals as transmission signals received in response to the first call placed by a cellular phone for a new account, analysis means for identifying said specific identification intercept received from said specific one of said transmitters to form an identification signal, storing means for associating said specific received intercept with a corresponding specific identification cluster stored in said storage means, marking means for marking said specific identification cluster as validated in response to said identification signal.

6. The apparatus of claim 4 wherein said control means specifies said transmitter validation signals as transmission signals received in response to a cellular call placed at a location of manufacture of said cellular phone.

7. In a transmitter identification system for identifying transmitters where each transmitter broadcasts transmitter signals and where, said transmitter signals are formed by processing information for manipulating a carrier, said transmitter signals include signal traits resulting from said processing that are characteristic of said transmitter, and said transmitter signals including an identification code identifying said transmitter, said transmitter identification system including, receiver means for receiving transmitter signals transmitted by said transmitters to provide corresponding received signals, detection means for detecting said received signals to recover identification codes corresponding to said transmitters, characterizing means for characterizing features of the signal traits of said received signals to form received intercepts corresponding to said transmitters, storage means for associating said received intercepts with identification clusters for identifying said transmitters, an apparatus for validating identification clusters derived from intercepts from a specific one of said transmitters comprising:

control means for specifying transmitter validation signals allocated for validating said specific one of said transmitters and for generating a specific identification intercept wherein said control means specifies said transmitter validation signals as transmission signals received in response to a cellular call placed at the location of customer distribution of said cellular phone, analysis means for identifying said specific identification intercept received from said specific one of said transmitters to form an identification signal, storing means for associating said specific received intercept with a corresponding specific identification cluster stored in said storage means, marking means for marking said specific identification cluster as validated in response to said identification signal.

8. A transmitter identification system for identifying transmitters where each transmitter broadcasts transmitter signals and where, said transmitter signals are formed by processing information for manipulating a carrier, said transmitter signals include signal traits resulting from said processing that are characteristic of said transmitter, and said transmitter signals include an identification code identifying said transmitter, said transmitter identification system including, receiver means for receiving transmitter signals transmitted by said transmitters to provide corresponding received signals, detection means for detecting said received signals to recover identification codes corresponding to said transmitters, characterizing means for characterizing features of the signal traits of said received signals to form received intercepts corresponding to said transmitters, storage means for associating said received intercepts with identification clusters for identifying said transmitters, validating means for validating identification clusters derived from intercepts, including one or more known intercepts, received from authorized ones of said transmitters, invalidating means for invalidating identification clusters derived from intercepts, including one or more known intercepts, received from unauthorized ones of said transmitters, said invalidating means including comparing means for comparing said known intercepts with said stored intercepts to provide an invalid indication for an identification cluster when said known intercepts do not match said stored intercepts.

9. The apparatus of claim 8 wherein said identification code includes dialed digits, wherein said storage means stores dialed digits together with an associated intercept of a received signal and wherein said invalidating means signals that service is to be denied for all cellular calls from transmitters with an intercept for an identification cluster having an invalid indication corresponding to said dialed digits.

10. The apparatus of claim 8 wherein said identification code includes dialed digits, therein said storage means stores dialed digits together with an associated intercept of a received signal and an associated identification cluster, wherein said comparing means compares said received intercept and corresponding dialed digits with stored invalidated intercepts and corresponding dialed digits to provide an invalid indication when said received intercepts and said dialed digits match said stored invalidated intercepts and corresponding dialed digits, and wherein said invalidating means marks the associated identification cluster invalid in response to said invalid indication.

11. An apparatus to validate identification clusters for transmitters that create intercepts where identification clusters are groups of statistical values derived from statistically processing intercepts comprising:

storage means for associating intercepts from transmitters with identification clusters, said storage means for associating multiple intercepts with a specific transmitter associated with a specific identification cluster, analysis means to process intercepts and identification clusters including said specific identification cluster stored in said storage means associated with said specific transmitter, said analysis means operating independently of individual intercepts, and said analysis means forming a validation signal or an invalidation signal as a function of processing said specific identification cluster for statistical comparison with other ones of said identification clusters, if any, marking means to mark said specific identification cluster valid or invalid in response to said validation signal or said invalidation signal, respectively.

12. The apparatus of claim 11 wherein said analysis means operates to form said validation signal when said specific identification cluster is the only identification cluster compiled from multiple intercepts for multiple received signals having the same identification code.

13. The apparatus of claim 12 wherein said analysis means operates to form said validation signal when said specific identification cluster is determined to be statistically significant.

14. The apparatus of claim 11 wherein said analysis means operates to form said validation signal when said specific identification cluster is determined to be typical of identification clusters observed from cellular phones from a manufacturer identified as part of the identification code.

15. The apparatus of claim 11 wherein said analysis means operates to form said validation signal when said specific identification cluster is statistically more significant than other identification clusters having the same identification code.

16. The apparatus of claim 11 wherein said analysis means operates to form said validation signal when none of the identification clusters have been marked valid for received signals having the same identification code.

17. The apparatus of claim 16 wherein said analysis means operates to form said validation signal when no other identification cluster has been marked valid for received signals having the same identification code and said specific identification cluster is determined to be typical of identification clusters observed from cellular phones from a manufacturer identified as part of the identification code.

18. The apparatus of claim 16 wherein said analysis means operates to form said validation signal when no identification cluster has been marked valid for received signals having the same identification code and said specific identification cluster is determined to be not atypical of identification clusters observed from cellular phones from a manufacturer identified as part of the identification code.

19. The apparatus of claim 11 wherein said analysis means operates to form said invalidation when said specific identification cluster is determined to be not typical of identification clusters observed from cellular phones from a manufacturer identified as part of the identification code.

20. The apparatus of claim 11 wherein said analysis means operates to form said invalidation signal when said specific identification cluster is determined to be typical of identification clusters observed from cellular phones from a manufacturer other than a manufacturer identified as part of the identification code.

21. The apparatus of claim 20 wherein said analysis means operates to form said invalidation s when said specific identification cluster is determined to be more than $10^6$ times more likely to be typical of identification clusters observed from cellular phones from a manufacturer other than the a manufacturer identified as part of the identification code.

22. An apparatus to validate identification clusters for transmitters that create intercepts where identification clusters are groups of statistical values derived from statistically processing intercepts comprising:
storage means for associating intercepts from transmitters with identification clusters, said storage means for associating multiple intercepts for a transmitter with a corresponding identification cluster,
analysis means to process intercepts and identification clusters stored in said storage means to detect specific intercepts for specific identification clusters associated with specific transmitters, said analysis means operating to form a validation signal or an invalidation signal as a function of processing ones of said specific identification clusters for statistical comparison with other ones of said specific identification clusters, if any, said analysis means forming said validation signal when received signals from multiple transmitters have the same identification number and have one or more common dialed digits that constitute one or more phone numbers,
marking means to mark said specific identification clusters valid or invalid in response to said validation signal or said invalidation signal, respectively.

23. The apparatus of claim 22 wherein said analysis means operates to form said validation seal only if at least one of said specific identification clusters is already marked valid.

24. The apparatus of claim 23 wherein said analysis means operates to form said validation signal when received signals from multiple transmitters have common dialed digits that constitute a common phone number.

25. The apparatus of claim 23 wherein said analysis means operates to form said validation signal when received signals are from multiple transmitters including both high-power transmitters and low-power transmitters and have common dialed digits that constitute a common phone number.

26. The apparatus of claim 23 wherein said analysis means operates to form said validation signal when received signals are from multiple transmitters including both high-power transmitters and low-power transmitters having common dialed digits that constitute a common phone number and wherein all said specific identification clusters are typical of those produced by Motorola phones and wherein said marking means marks all said specific identification clusters valid.

27. The apparatus of claim 22 wherein said analysis means operates to form said validation signal when received signals from multiple transmitters have common dialed digits that constitute a common phone number and wherein said marking means marks only a specific one of said specific identification clusters valid.

28. The apparatus of claim 27 wherein said analysis means operates to form said invalidation signal when received signals from multiple transmitters have common dialed digits that constitute a common phone number and wherein said marking means marks ones of said specific identification clusters other than said-specific one of said specific identification clusters invalid.

29. The apparatus of claim 22 wherein said analysis means operates to form said validation signal when received signals from multiple transmitters have the same identification number and have one or more common dialed digits that constitute one or more common phone numbers occurring from received signals two or more times.

30. The apparatus of claim 22 wherein said analysis means operates to form said validation signal when received signals from multiple transmitters have the same identification number and have one or more common dialed digits that constitute one or more common phone numbers and the common dialed digits that constitute a common phone number are not observed as dialed digits that constitute a phone number from recently received signals from a transmitter from another cellular phone.

31. In a transmitter identification system for identifying transmitters where each transmitter broadcasts transmitter signals and where,
said transmitter signals are formed by processing information for manipulating a carrier, said transmitter signals include signal traits resulting from said processing that are characteristic of said transmitter, and said transmitter signals including an identification code identifying said transmitter,
said transmitter identification system including,
receiver means for receiving transmitter signals transmitted by said transmitters to provide corresponding received signals, detection means for detecting said received signals to recover identification codes corresponding to said transmitters, characterizing means for characterizing features of the signal traits of said received signals to form received intercepts corresponding to said transmitters, storage means for associating said received intercepts with identification clusters for identifying said transmitters,
an apparatus for validating identification clusters derived from intercepts from a specific one of said transmitters comprising:
analysis means for counting a first number of received intercepts corresponding to first identification clusters from specific received signals from said specific one of said transmitters and for counting a second number of received intercepts corresponding to second identification clusters from received signals from other ones of said transmitters having the same identification code as said specific one of said transmitters, said analysis means generating a validating signal when said first number exceeds a first threshold and said second number is below a second threshold where said first threshold is greater than said second threshold,
storing means for associating said specific received intercepts with a corresponding specific identification cluster and for associating other received intercepts with other identification clusters in said storage means,
marking means for marking said first specific identification cluster as validated in response to said validation signal.

32. The apparatus of claim 31 wherein said analysis means generates said validation signal only if none of said identification clusters have been previously validated.

33. The apparatus of claim 31 wherein said analysis means generates said validation signal only if said specific identification cluster is determined to be typical of identification clusters observed from cellular phones from a manufacturer identified as part of the identification code in said specific received signals.

34. The apparatus of claim 33 wherein said analysis means generates said validation signal only if none of said identification clusters have been previously validated.

35. In a transmitter identification system for identifying transmitters where each transmitter broadcasts transmitter signals and where, said transmitter signals are formed by processing information for manipulating a carrier, said transmitter signals include signal traits resulting from said processing that are characteristic of said transmitter, and said transmitter signals including an identification code identifying said transmitter, said transmitter identification system including, receiver means for receiving transmitter signals transmitted by said transmitters to provide corresponding received signals, detection means for detecting said received signals to recover identification codes corresponding to said transmitters, characterizing means for characterizing features of the signal traits of said received signals to form received intercepts corresponding to said transmitters, storage means for associating said received intercepts with identification clusters for identifying said transmitters, an apparatus for validating identification clusters derived from intercepts from a specific one of said transmitters comprising:

analysis means operating to generate an invalidating signal when said specific identification cluster is more likely to be from a manufacturer different from the manufacturer identified as part of the identification code, storing means for associating said specific received intercepts with a corresponding specific identification cluster in said storage means, marking means for marking said specific identification cluster as invalid in response to said invalidation signal.

36. The apparatus of claim 35 wherein said analysis means generates said validation signal only if none of said identification clusters have been previously validated.

37. The apparatus of claim 35 wherein said analysis means generates validation signals for all identification clusters having said specific identification code and not corresponding to a specific identification cluster marked invalid, said marking means marking said particular specific identification clusters valid.

38. The apparatus of claim 37 wherein said analysis means generates said validation signal only if none of said identification clusters have been previously validated.

* * * * *